Sept. 7, 1965  G. E. LANE  3,204,793
FRONT END LOADER AUTOMATIC IMPLEMENT ATTACHMENT APPARATUS
Filed June 28, 1963
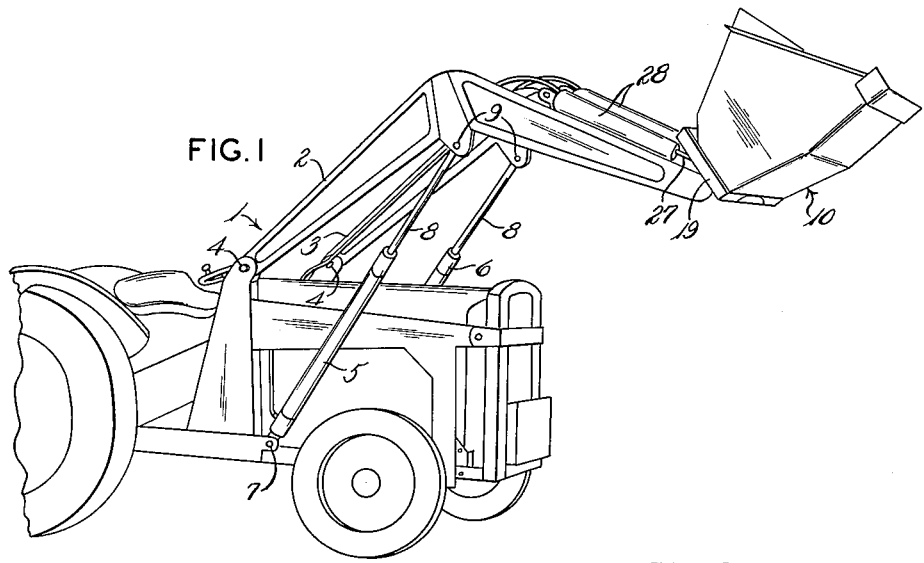
FIG. 1
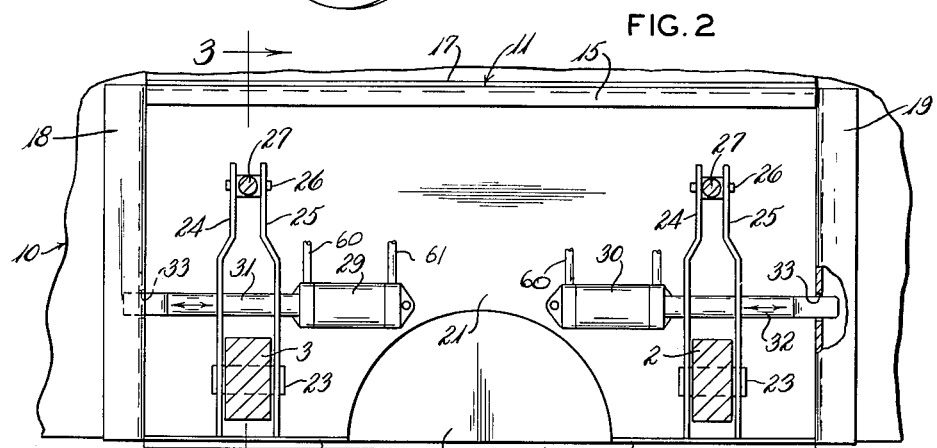
FIG. 2
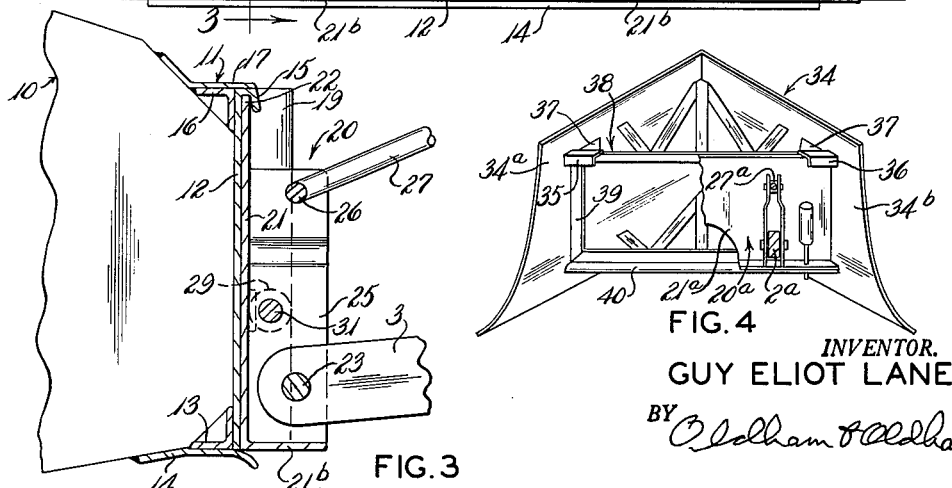
FIG. 3
FIG. 4
INVENTOR.
GUY ELIOT LANE
BY Oldham & Oldham
ATTYS.

3,204,793
FRONT END LOADER AUTOMATIC IMPLEMENT
ATTACHMENT APPARATUS
Guy E. Lane, 738 S. Belle Vista, Youngstown, Ohio
Filed June 28, 1963, Ser. No. 291,462
13 Claims. (Cl. 214—140)

The present invention relates to automatic implement attachment apparatus for vehicles, such as front end loaders, where an implement can be automatically attached to and released from the vehicle, or loader for operative association therewith.

Heretofore in tractors and other vehicles, appreciable work has been done to endeavor to provide some type of automatic hitch or attachment apparatus by which various implements can be attached to the tractor, or other vehicle. Various means proposed heretofore have been automatically operable to permit the operator of the vehicle to attach or release an implement to the vehicle without descending from the vehicle. However, insofar as I am aware, none of such automatic attachment means as have been provided heretofore, have been adapted for efficient use with vehicles, such as front end loaders, or other vehicles having tools or implements operably associated with the front end of the vehicle for operation when the vehicle moves forwardly.

One problem that is encountered in vehicles of this type is that the conventional pair of control arms provided on front end loaders, as made today, are relatively heavy and must protrude forwardly from the vehicle for engagement with an implement for use thereof. In the attachment, or hitches available in the trade today, when applied to these front end loaders, position the implement too far forwardly with relation to the vehicle so that the implement is not positioned immediately adjacent the front end of the vehicle. Naturally with implements of this type; relatively massive forces and stresses are set up thereby in the implement support means and the vehicle whereby a lifting moment is applied to the rear end of the vehicle, or front end loader, and the amount of load or work that the implement can do has been appreciably curtailed by prior types of attachments. Many of these front end loaders, or similar vehicles as made today do not provide any automatic engagement, or release of the implement with relation to the vehicle, as the implements may be permanently secured to the vehicles. In order to obtain wider use of these vehicles, it naturally is highly desirable that the vehicle be adapted to be used with a variety of implements any one of which can be readily and easily engageable with the vehicle for operative association therewith.

It therefore is the general object of the present invention to provide a new and improved type of automatic implement attachment apparatus for front end loaders and other vehicles, which apparatus is characterized by the fact that an implement can be efficiently and readily attached to or released from a vehicle on the front end thereof for locked, operative engagement therewith.

A further object of the invention is to provide new and improved apparatus of the class described wherein a pair of complementary hitch members are provided on the vehicle and on the implement, which hitch members can be readily engageable with each other by substantially conventional means operatively associated with the vehicle hitch member for controlling the position of the vehicle hitch member and facilitating a tilting and lifting engagement action between the hitch members.

Another object of the invention is to provide a pair of interengageable hitch members positioned on the front end of a vehicle and on an implement wherein an elongate overhanging top flange means is provided on the implement hitch member and a flat plate member is provided on the vehicle hitch means to permit tilting the vehicle hitch means forwardly and engaging the flat plate member under the overhanging flange on the implement hitch member, while first previously bringing the hitch members into lateral alignment with each other so that an automatic engagement action can be obtained between the implement and the vehicle.

Yet another object of the invention is to provide hitch or coupling members for securing implements to a carrier vehicle and where such members are of minimum longitudinal size, or thickness to permit the implement to be positioned immediately adjacent, or on the ends of the positioning members normally carried by the vehicle for engaging and controlling operation of the implement.

The foregoing and other objects and advantages of the invention will be made more apparent as the specification proceeds.

Attention now is particularly directed to the accompanying drawings, where:

FIG. 1 is a perspective view of the vehicle having an automatic implement attachment apparatus of the invention securing an implement thereto, which apparatus embodies the principles of the invention;

FIG. 2 is a fragmentary enlarged vertical section taken through the support arms positioned on the vehicle and looking forwardly towards the implement and hitch members of the invention;

FIG. 3 is a vertical section taken on line 3—3 of FIG. 2; and

FIG. 4 is a perspective view, partially broken away and shown in vertical section, of a different type of an implement and modified hitch or coupling means of the invention adapted to position the implement on the vehicle.

When referring to corresponding members shown in the drawings and referred to in the specification, corresponding numerals are used to facilitate comparison therebetween.

The present invention, generally speaking, in one embodiment thereof, relates to the combination with a vehicle of means positionable at the front end of the vehicle for supporting an implement, an implement having a back section positionable adjacent the vehicle, downwardly directed overhanging first coupling means secured to the back section with the overhanging portion thereof spaced from the back section and extending towards the vehicle, a second coupling means including a vertically extending plate having a top edge engageable with the overhanging portion of the first coupling means by relative vertical movement therebetween, first means engaging the second coupling means to attach it to the vehicle but to provide vertical movement of the second coupling means relative to the vehicle, and second means engaging the second coupling means and operatively secured to the vehicle to tilt the second coupling means and the plate forwardly with relation to the vehicle to facilitate engaging the second coupling means with the first coupling means, and interengaging locking means on the coupling means for securing them in engaged relationship for operative use of the implement.

Reference now is particularly directed to the details of the structure shown in the accompanying drawings, and a conventional vehicle, in this instance a front end loader 1, is shown. This front end loader 1 includes a pair of support arms 2 and 3 that are pivotally attached to the vehicle by positioning shafts 4 whereby the lift or support arms 2 and 3 are positioned for vertical movement in planes defined by the lift arms as moved with relation to the shafts or pins 4. The positions of the lift arms 2 and 3 are controlled by conventional means, for example, hydraulic cylinders 5 and 6 that are pivotally attached to the vehicle 1 as at 7. Piston rods 8 extend from these hydraulic cylinders 5 and 6 and are pivotally secured to the lift arms 2 and 3 by control pins or rods 9 whereby these lift arms 2 and 3 and any member supported thereon can be raised or lowered with relation to the remainder of the vehicle 1.

This front end loader or vehicle 1 is adapted to use any of a number of implements therewith, and in this instance, a scoop or bucket 10 is shown as an implement to be operatively attached to the lift arms 2 and 3 for dirt moving operations. This bucket 10 is of conventional construction and it is supported on and engaged with the lift arms 2 and 3 by the particular means described hereinafter for operative association with and control from the vehicle 1.

An important feature of the present invention resides in the hitch means, or coupling means used for removably attaching the bucket 10 to the lift arms 2 and 3 and for positioning this bucket 10 immediately adjacent the forward ends of these lift arms 2 and 3 to minimize the spacing of the bucket 10 forwardly of the lift arms 2 and 3. These lift arms 2 and 3 are usually made of such length as to conveniently clear the forward end of the vehicle 1 and permit the bucket 10 to be used immediately adjacent the front portion of this vehicle.

FIGS. 2 and 3 of the drawings best show that the bucket 10 has an implement coupling means, or hitch member 11 secured thereto and extending therefrom in a direction towards the vehicle 1, or rearwardly of the bucket 10. This implement or female hitch member 11 includes a flat plate 12 secured against a portion of the bucket 10 by suitable means. The flat plate 12 is positioned on the bucket 10, for example, by means of a lower corner support angle 13 and a tie plate 14 that would, for example, be welded to the rear surface of the bucket 10 and also have the plate 12 welded thereto. An important and novel feature in the implement hitch member 11 is provided at the top thereof in the shape of an overhanging, rearwardly extending top flange 15. The upper end of the flat plate 12 is suitably reenforced and secured to the bucket 10 as by means of a reenforcing angle 16 and a tie plate 17 that are suitably welded to the bucket and to the flat plate 12 to position it securely on the bucket 10. The implement hitch member also has operatively associated therewith a pair of vertically extending side guide plates 18 and 19. These guide plates 18 and 19 may be welded or otherwise secured to the bucket 10 at the lateral margins of the flat plate 12 to extend rearwardly and flare outwardly with relation to each other from the back surface of the bucket 10.

A vehicle hitch, or coupling member indicated as a whole by the numeral 20 is provided and it includes a flat normally vertically positioned plate 21 that has an exposed upper end 22 which is adapted to be engaged in under the top flange 15 of the plate 12 and provide an automatically engageable action between the two hitch members 11 and 20 of the invention, as hereinafter described in more detail. The plate 21 may have any suitable reenforcing means associated therewith, such as a bottom flange 21b, and any other reenforcing flanges, or means, as are desired, except that the upper end 22 of the plate 21 must not have any encumbrances thereon that prevent its ready engagement with the top flange 15. This plate 21 is secured to the front ends of the lift arms 2 and 3 by support pins 23 which extend through holes provided in the front ends of the lift arms 2 and 3. The support pins 23 engage pairs of reenforcing and positioning flanges, or bars 24 and 25 secured to the plate 21 and extending therefrom towards the vehicle 1. A pair of these bars 24 and 25 is provided adjacent each lateral margin of the plate 21, which plate 21 is of substantially the same lateral width as the space between the guide plates 18 and 19, at the edges of the flat plate 12. Adjacent the upper ends of the bars 24 and 25, a pin 26 is provided to engage and extend between each pair of bars 24 and 25 to secure a piston rod 27 thereto. These piston rods 27 extend from suitable control means, such as hydraulic cylinders 28, one of which is operatively associated with each of the lift arms 2 and 3. The cylinders 28 are controlled in a suitable manner from the vehicle 1 to force the piston rods 27 from, or to pull the rods back into the cylinder 28 for controlling the angle of the plate 21 to the vertical, and to tilt such plate forwardly towards the implement 10, when desired. The pins 23 pivotally secure the bucket 10 to the lift arms 2 and 3 at the front ends thereof for control of the general vertical position of the bucket 10 through the cylinders 5 to pivot the bucket by the cylinders 28 operatively engaging portions of the plate 21 spaced vertically from the pivot pins 23.

When engaging the implement to the vehicle, the vehicle is first brought adjacent the back of the bucket 10 and the plate 21 is lowered and tilted forwardly. After the plate 21 has been tilted forwardly by use of the cylinders 28 and piston rods 27, the vehicle 1 is maneuvered to bring the upper edge of the plate 21 into contact with the plate 12 on the bucket and then the upper end 22 of this plate 21 can be raised by the cylinders 5 and/or 28 and be slid in underneath the top flange 15. Further vertical upward movement of the lift arms 2 and 3 will bring the adjacent surfaces of the plates 21 and 12 into full bearing contact with each other. During this engaging action, the guide plates 18 and 19 have aided the plates 21 and 12 to be slid into operatively centered relationship with each other, and then the vertical movement of the plate 21 lifts the bucket 10 into the engaged position shown in FIG. 3.

It is desirable to lock the implement in its operative engagement with the vehicle, or male hitch member 20, so that suitable locking means are provided on the hitch members to achieve this result. Such locking means are shown as including a pair of double acting control cylinders 29 and 30 secured to the plate 21 on its back surface and which have locking bars or piston rods 31 and 32, respectively, extending therefrom, to be moved laterally outwardly, or to be pulled back inwardly, depending upon the actuation of the control cylinders 29 and 30. Suitable apertures 33 are provided in the guide plates 18 and 19 for receiving the ends of the piston rods 31 and 32 to secure the implement hitch member 11 and vehicle hitch member 20 in locked engagement after the engagement of the upper end 22 of the plate 21 with the top flange 15.

It will be realized that the hitch or coupling members of the invention may be of different forms than those shown in FIGS. 1 through 3 thereof, and that other implements can be picked up by the apparatus of the invention. Thus a substantially conventional snow plow 34 is shown that is adapted to be secured to some type of a vehicle to be attached to the forward end thereof to push or shove snow out of the path of the vehicle. This snow plow 34 is shown as having a pair of overhanging flanges 35 and 36 provided at laterally spaced portions thereof and suitably secured to the plow 34 as by tie or anchor plates 37. These flanges 36 and anchor plates 37 form a portion of the implement hitch member indicated as a whole by the numeral 38, which hitch member also includes means such as an open centered frame, or plate 39. The frame 39 is secured to the snow plow 34 and extends transversely thereof normal to its longitudinal axis, which frame extends between a pair of blades 34a and 34b forming the snow plow.

Similar means to that previously described comprise the vehicle hitch means 20a shown in FIG. 4 and in this instance, the hitch includes a plate 21a that is engaged by lift arms 2a in a manner similar to that previously described. In all events, the flat plate 21a would be brought up into abutment with the frame 39 or equivalent means in the implement hitch, and in this instance, the sides of the snow plow blades 34a and 34b provide guides to center the plate 21a with a relation to the implement hitch member 38. This frame means 39 is shown as including a bottom flange 40 that may be turned downwardly at the end thereof extending towards the vehicle with which the snow plow 34 will be used. Control means, including a cylinder (not shown) and a piston rod 27a extending therefrom extends between the vehicle and plate 21a to be pivotally secured thereto as in the other embodiment of the invention. In all events, the control means and piston rod 27a provided for the plate 21a can tip it forwardly to introduce such plate 21a under the overhanging flanges 36 provided on the implement hitch member in this embodiment of the invention. Next tilting the plate 21a back into a vertical position will produce full engagement of the hitch members. Or naturally, in either form of the invention disclosed, the flat plate means provided on the vehicle hitch means can be brought into direct abutment with the flat plate means, or flat surfaces forming a plane in the implement hitch means after which the flat plate member of the vehicle hitch means can be raised vertically to engage the upper edge of the flat plate with the overhanging flange on the cooperating coupling or hitch member.

From the above description of the invention, it will be seen that two flat surfaced plates, or flat surface forming means, can be used in the hitch means of the invention to aid in obtaining an automatic hitch, or coupling action. Also, other means may be provided on the implement, such as a pair of spaced overhanging flanges, in association with some flat surface forming means thereadjacent and therebelow which can have the flat surface means of the implement hitch brought into contact therewith to obtain engagement of the hitches by a vertical lifting or tilting action of the lift arms 2 and 3, or similar control arms on the vehicle. The flat surfaced means on the implement may be integral therewith, it will be seen, and be a part of the implement as originally produced for conventional use.

By the use of one relatively thin plate on the vehicle hitch member and by a similar plate 12 or other flat surfaced forming means provided on the implement hitch, the hitch members, when coupled together, are of very short extent in a longitudinal direction whereby the load applied to the implement 10 is carried substantially directly at the ends of the lift arms 2 and 3 and the overturning forces, or moment applied to the vehicle 1 are of substantially minimum value. Yet one still realized the benefits of the invention in the provision of automatically engageable and releasable implements, any of a plurality of which can be used with the vehicle 1. In some instances, obviously the flat surface provided by the plate 12 may be formed directly on the implement 10 so that, if desired, the member 12 can be omitted, and only the overhanging flange 15 or equivalent, could be added as a separate unit to the back portion of the implement 10 whereby the plates 21 then would abut directly against a back or a flat surface on the implement 10 and be brought up into engagement with the flange 15. This flange 15 may be a continuous, elongate member, or it could be provided by a plurality of members, such as the members 36, 36 shown in FIG. 4 of the drawings. FIG. 4, as will be realized, shows the provision of a flat surfaced means in the implement 34 by a frame 39 which may or may not be open centered, as desired. It is important that some type of a flat surfaced means, or flat surfaced defining means be provided on the implement and that such flat surfaced means would normally be in a substantially vertical position when the implement 10 is at its normal resting position on the ground. Hence, engagement of the two hitch members of the invention is facilitated by convenient and easily effected maneuvering of the vehicle 1 and the vehicle hitch member controlled thereby.

The front end loader 1 naturally can tip over or roll the implement to a new position, if the implement is improperly positioned.

The word "axial" as used in the specification and claims refers to the axis of connection between the vehicle and the implement to indicate distances along such line or connection.

The control cylinders 29 and 30 are remotely actuated from the front end loader 1 by hydraulic tubes 60 and 61 connected therebetween.

It will be seen that the hitch or coupling means of the invention are adapted for use with any vehicle such as those adapted for agricultural or industrial use.

From the foregoing, it will be seen that a new and improved hitch or coupling means has been provided by the invention by which implements can be readily attached to and released from vehicles, such as front end loaders whereby the implement is secured in an efficient, secure manner to the vehicle for use thereof. These hitch members are of sturdy construction, but yet are relatively inexpensive to build and can be readily secured to conventional implements and vehicles, and to conventional means, such as lift arms provided on the vehicles. The implements still can be easily controlled from the vehicle, and any conventional means such as hydraulic cylinders can be used for controlling operation of the implements attached to the vehicle. Hence it is believed that the objects of the invention have been achieved.

While two complete embodiments of the invention have been disclosed herein, it will be appreciated that modification of these particular embodiments of the invention may be resorted to without departing from the scope of the invention as defined in the appended claims.

What I claim is:

1. The combination with a vehicle having a pair of lift arms pivotally secured to said vehicle and extending forwardly therefrom a distance beyond said vehicle, said lift arms being movable down to the ground in front of said vehicle, and means operatively secured between said lift arms and vehicle to move said lift arms in vertical planes relative to said vehicle of
   an implement,
   an axially short laterally wide implement hitch member secured to said implement and extending towards said vehicle by a portion thereof including a means having a planar surface therein and a downwardly extending offset top flange,
   a vehicle hitch member including a flat plate to abut on said planar surface and to engage said top flange, said flat plate being pivotally secured to said lift arms,
   control means operatively extending between said lift arms and said flat plate to tilt said plate forwardly to aid in engaging it with said top flange,
   a pair of vertically extending guide means at the lateral margins of said implement hitch member to engage and center said vehicle hitch member with relation to said implement hitch member, said guide means each having a locking aperture formed therein, and
   locking cylinders including piston rods operatively secured to said vehicle hitch member and operable to force said piston rods laterally outwardly to engage said locking apertures and secure said implement and vehicle hitch members together.

2. The combination with a vehicle having a pair of lift arms pivotally secured to said vehicle and extending forwardly therefrom, and means operatively secured between said lift arms and vehicle to move said lift arms in vertical planes relative to said vehicle of
   an implement,
   an implement hitch secured to said implement and extending towards said vehicle, said implement hitch including a means defining a planar surface, a means forming a downwardly extending offset top flange, and a means having locking apertures therein,
   a vehicle hitch including a flat plate to abut on said planar surface and to engage said top flange carried by said lift arms, said flat plate being pivotally secured to said lift arms and extending therebetween, control means operatively engaging and extending between said lift arms and said flat plate to tilt said plate forwardly to aid in engaging it with said top flange, and locking cylinders including lock bars operatively secured to said vehicle hitch and operable to move said lock bars to engage said locking apertures and secure said implement and vehicle hitches together.

3. The combination with a vehicle having a pair of lift arms pivotally secured to said vehicle and extending forwardly therefrom, and means operatively secured between said lift arms and vehicle to move said lift arms in vertical planes relative to said vehicle and down to position the front ends of said lift arms adjacent the lower part of the front end of said vehicle, an implement, an axially short implement hitch member secured to said implement and including a means having an elongate planar surface therein and a downwardly extending offset top flange, a vehicle hitch member including an elongate flat plate to abut on said planar surface and to engage said top flange, means pivotally securing a lower portion of said flat plate to said lift arms to extend therebetween, control means operatively extending between said lift arms and an upper portion of said flat plate to tilt said plate forwardly and to control said implement, a vertically extending outwardly flared guide means at each of the lateral margins of said implement hitch member to engage and center said vehicle hitch member with relation to said implement hitch member, said guide means each having a locking aperture formed therein, and a pair of locking cylinders including lock bars operatively secured to spaced portions of said vehicle hitch member and operable to force said lock bars laterally outwardly to engage said locking apertures and secure said implement and vehicle hitch members together.

4. The combination with a vehicle of means movably carried by the vehicle and positionable at the front end of the vehicle for supporting an implement, an implement having a flat vertically extending back section normally positionable adjacent said vehicle, downwardly directed overhanging first coupling means secured to an upper portion of said back section with the overhanging portion thereof spaced from said back section, a second coupling means including a vertically extending plate engageable with said overhanging portion of said first coupling means, first means engaging said second coupling means to attach it to said vehicle means to provide movement of said second coupling means relative to said vehicle, second means engaging said second coupling means and operatively engaging said vehicle to tilt said second coupling means and said plate forwardly with relation to said vehicle to facilitate engaging said second coupling means with said first coupling means by controlled movement of said second means, and interengaging locking means on said coupling means to secure them in engaged relation.

5. The combination with a vehicle of means operatively positioned at the front end of the vehicle for supporting an implement and for moving it vertically, an implement, first coupling means secured to said implement and including a horizontally positioned overhanging portion and a flat surface means below said overhanging portion thereof, said flat surface means being in direct contact with a portion of said implement, a second coupling means including a normally vertical positioned plate having an upper edge engageable with said overhanging portion of said first coupling means, first means engaging said second coupling means to attach it to said vehicle means to provide vertical movement of said second coupling means relative to said vehicle, second means engaging said second coupling means and operatively engaging said vehicle means to tilt said second coupling means and said plate forwardly with relation to said vehicle to facilitate engaging said second coupling means with said first coupling means, and interengaging locking means on said coupling means to secure them in engaged relation.

6. In a vehicle and implement combination, a male hitch member including a flat plate attached to the vehicle, power means for lifting and lowering said hitch member, a female hitch member on the implement and including a flat plate means and an overhanging flange for receiving said male hitch member for load transfer and support action therebetween, and means operatively connecting said male hitch member to said vehicle to tilt said flat plate forwardly and to move it to a normal substantially vertical position, said hitch members being engageable by abutting the upper edge of said flat plate against said flat plate means and lifting said flat plate up into engagement with said overhanging flange to obtain full engagement of said hitch members.

7. In a vehicle and implement combination, a male hitch member including an elongate flat plate attached to the vehicle, power means for lifting and lowering said male hitch member, a female hitch member on the implement and including an elongate flat surface forming means forming a portion of the implement and an overhanging top flange for receiving said male hitch member for load transfer and support action therebetween, means operatively connecting said male hitch member to said vehicle to tilt said flat plate forwardly, said hitch members being engageable by abutting said flat plate against said flat surface forming means and lifting said flat plate up into engagement with said overhanging flange to obtain full engagement of said hitch members, said male hitch member being movable to engage said implement and move it to position said flat surface forming means and top flange for engagement by said male hitch member, and locking means carried by said male hitch member and movable to engage said female hitch member to secure said hitch members together.

8. The combination with a vehicle of means positionable at the front end of the vehicle for supporting an implement, an implement having a back section positionable adjacent said vehicle and having a device in direct contact with said implement defining a plane, downwardly directed overhanging first coupling means secured to said back section with the overhanging portion thereof spaced from said back section, a second coupling means including a vertical plate having a top edge engageable with said overhanging portion of said first coupling means and with said device, first means engaging said second coupling means to attach it pivotally to said vehicle, second means engaging said second coupling means and operatively engaging said vehicle to tilt said second coupling means and said plate forwardly with relation to said vehicle to facilitate engaging said top edge of said second coupling means with said first coupling means, and interengaging locking means on said coupling means to secure them in engaged relation.

9. In a vehicle and implement combination, a male hitch member including a flat surface forming means attached to the vehicle and having a top edge, a female hitch member on the implement in direct contact with a conventional portion thereof and operatively forming a flat plate means abutted against said flat surface forming means of said male hitch member, said female hitch member having an overhanging flange extending towards the vehicle for receiving the top edge of said male hitch member thereunder to engage therewith for load transfer and support action therebetween, and
means operatively connecting said male hitch member to said vehicle to tilt said flat surface forming means forwardly,
said hitch members being engageable by abutting the top edge of said flat surface forming means against said flat plate means and moving said flat surface forming means up into engagement with said overhanging flange to obtain full engagement of said hitch members.

10. In a vehicle and implement combination,
a male hitch member including a flat plate means having a top edge section attached to the vehicle,
power means for lifting and lowering said male hitch member,
a female hitch member on the implement in axially adjacent relation thereto on the axis of connection between the vehicle and implement and operatively forming a second flat plate means abutted against said first flat plate means, said female hitch member having an overhanging flange thereon extending toward said vehicle receiving said male hitch member for load transfer and support action therebetween, and
interengaging locking members of said hitch members to secure them in engaged relation,
said hitch members being engageable by abutting said first flat plate means against said second flat plate means when said implement is on the ground and lifting said first flat plate means up to engage its top edge section with said overhanging flange for load transmitting engagement therebetween.

11. The combination with a vehicle having a pair of lift arms pivotally secured to said vehicle and extending forwardly therefrom, and means operatively secured between said lift arms and vehicle to move said lift arms in vertical planes relative to said vehicle of
an implement,
an axially short implement hitch member secured to said implement and extending towards said vehicle by a portion thereof including a means having a planar surface therein and a downwardly extending offset top flange,
a vehicle hitch member including a flat section to abut on said planar surface and a section to engage said top flange,
means pivotally securing said vehicle hitch member to said lift arms,
control means operatively extending between said lift arms and said vehicle hitch member to tilt said flat section forwardly to aid in engaging said flat section with said top flange,
a pair of vertically extending guide means at the lateral margins of said implement hitch member to engage and center said vehicle hitch member with relation to said implement hitch member, said guide means each having a locking aperture formed therein, and
locking cylinders including piston rods operatively secured to said vehicle hitch member and operable to force said piston rods laterally outwardly to engage said locking apertures and secure said implement and vehicle hitch members together.

12. The combination with a vehicle having a pair of lift arms pivotally secured to said vehicle and extending forwardly therefrom beyond the front end of said vehicle, and means operatively secured between said lift arms and vehicle to move said lift arms in vertical planes relative to said vehicle and the front ends of the arms to positions adjacent the front end of said vehicle,
an implement,
an implement hitch member secured to a part of said implement and extending towards said vehicle by a portion thereof including a means having a planar surface therein and a downwardly extending offset top flange, said planar surface means being immediately adjacent said implement,
a vehicle hitch member including a flat section to abut on said planar surface and a section to engage said top flange,
means pivotally securing said vehicle hitch member to said lift arms at the front ends thereof, and
control means operatively extending between said lift arms and said vehicle hitch member to tilt said flat section forwardly to aid in engaging said flat section with said top flange by action of said first-named means and said control means whereby said implement is secured to said lift arms at a short distance forwardly of the ends thereof determined by the thickness of said flat section and said planar surface means.

13. The combination with a vehicle having a pair of lift arms pivotally secured to said vehicle and extending forwardly therefrom to the front end of said vehicle, and means operatively secured between said lift arms and vehicle to move said lift arms in vertical planes relative to said vehicle of
an implement,
an axially short implement hitch member secured to but abutted against a part of said implement and extending towards said vehicle by a portion thereof including a means having a planar surface therein and a downwardly extending offset top flange,
a vehicle hitch member including a flat section to abut on said planar surface and a section to engage said top flange,
means pivotally securing said vehicle hitch member to said lift arms at the front ends thereof, and
control means operatively extending between said lift arms and said vehicle hitch member to tilt said flat section forwardly to aid in engaging said flat section with said top flange by action of said first-named means and said control means whereby said implement is secured to said lift arms at a short distance forwardly of the ends thereof determined by the thickness of said flat section and said planar surface means.

References Cited by the Examiner

UNITED STATES PATENTS

| 2,303,001 | 11/42 | Ruddock | 214—140 |
| 2,447,150 | 8/48 | Andersen | 214—145 |
| 2,630,231 | 3/53 | Klinge | 214—140 |
| 2,835,397 | 5/58 | Wagner | 214—140 |
| 3,034,237 | 5/62 | Wolfe et al. | 214—145 X |

FOREIGN PATENTS 582,493   9/58   Italy.

HUGO O. SCHULZ, *Primary Examiner.*